C. W. STEWART.
ARMORED TIRE STRUCTURE.
APPLICATION FILED SEPT. 8, 1916.
1,236,227.
Patented Aug. 7, 1917.
2 SHEETS—SHEET 1.
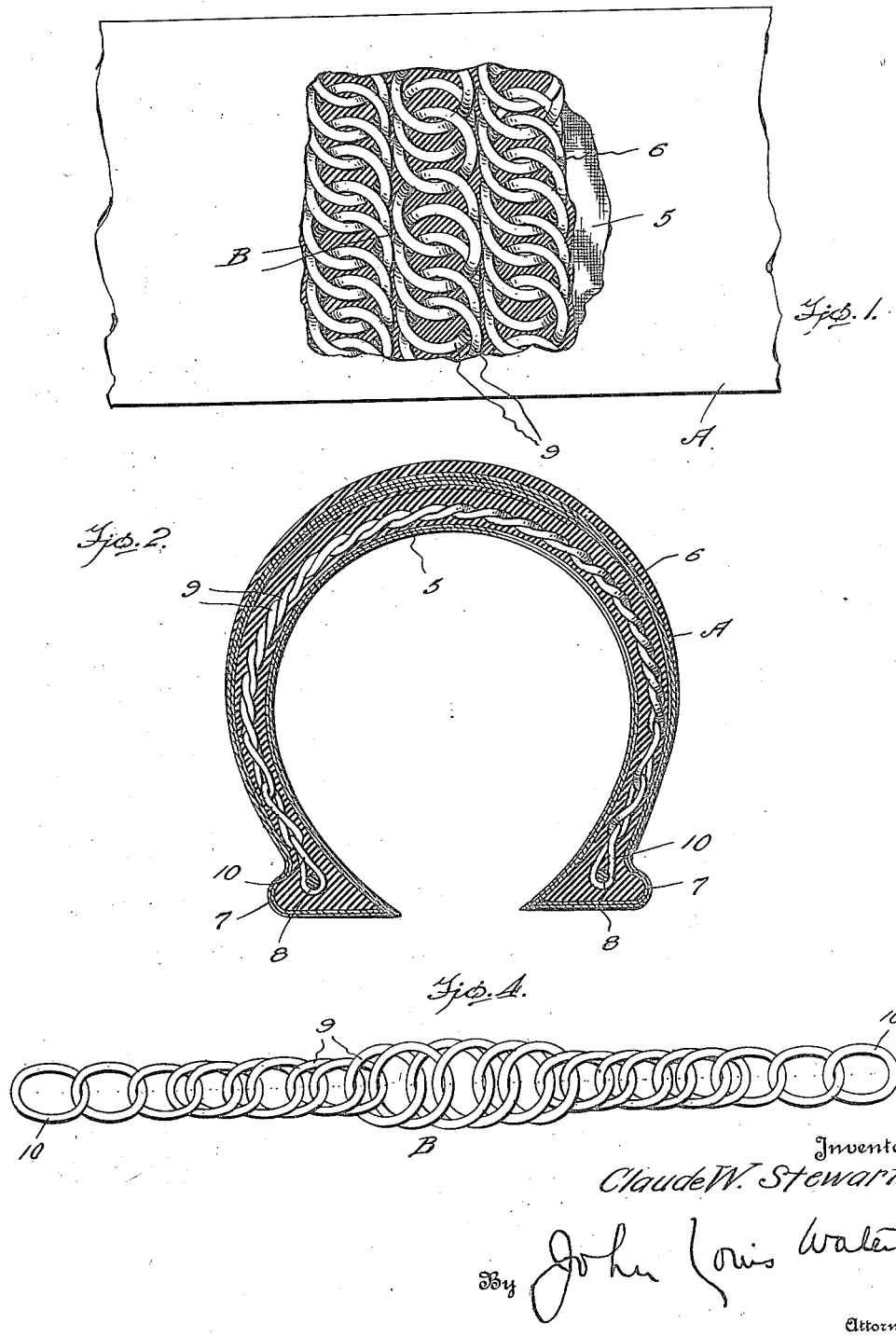

C. W. STEWART.
ARMORED TIRE STRUCTURE.
APPLICATION FILED SEPT. 8, 1916.
1,236,227.
Patented Aug. 7, 1917.
2 SHEETS—SHEET 2.
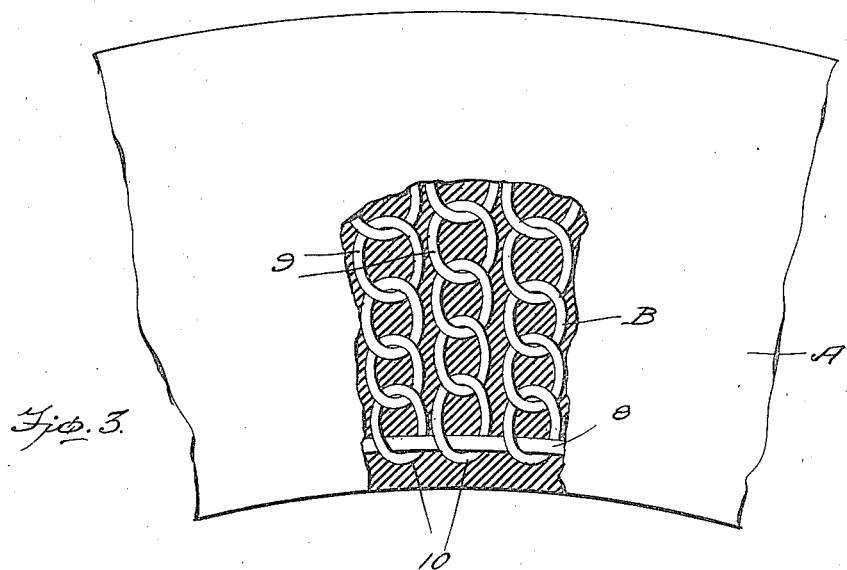
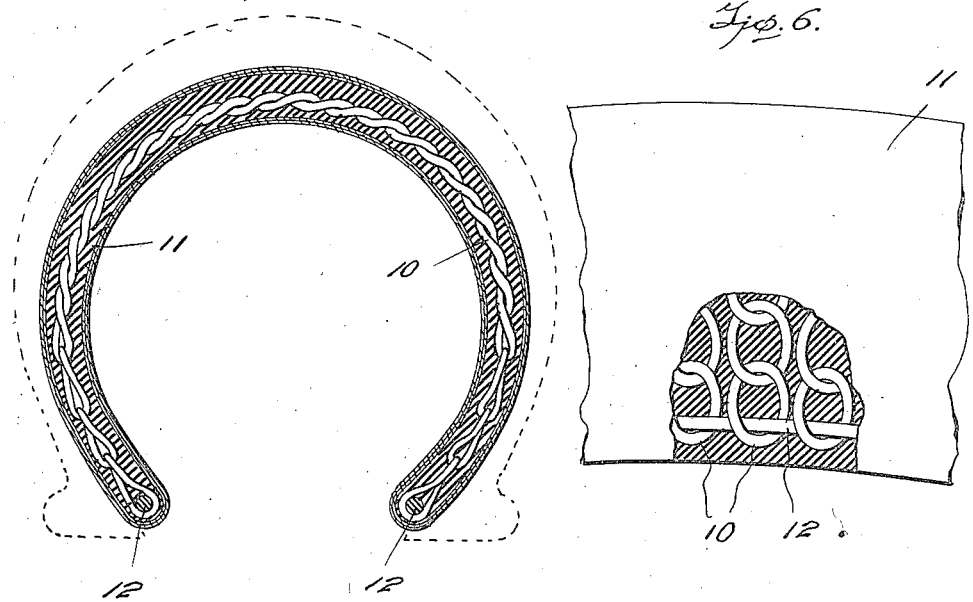
Inventor
Claude W. Stewart.
By John Louis Wales
Attorney

UNITED STATES PATENT OFFICE.

CLAUDE W. STEWART, OF MARTINSBURG, WEST VIRGINIA.

ARMORED TIRE STRUCTURE.

1,236,227. Specification of Letters Patent. Patented Aug. 7, 1917.

Application filed September 8, 1916. Serial No. 119,083.

*To all whom it may concern:*

Be it known that I, CLAUDE W. STEWART, a citizen of the United States, residing at Martinsburg, in the county of Berkeley and State of West Virginia, have invented certain useful Improvements in Armored Tire Structures, of which the following is a specification, reference being had therein to the accompanying drawing.

The invention relates to armored tires, and more particularly to the class of reinforced shoes or protectors for the inner tubes of tires such as vehicle, automobile or the like tires.

The primary object of the invention is the provision of a shoe of this character wherein the body thereof is materially reinforced with chain lengths independent of each other and disposed transversely of said body so as to prevent blow-outs, stone or curb bruises and cuts, punctures or the like in the use of the tire, thereby giving longevity thereto without altering or otherwise disturbing the required resiliency of said tire, and the resiliency of the chain lengths prevents the pulling of one chain upon the other circumferentially of the tire when depressed at any point thereof.

Another object of the invention is the provision of a shoe of this character wherein the reinforcements, which are in the form of a series of chains disposed transversely within the body of the shoe circumferentially thereof, are disposed in a manner relative to each other so as to reinforce the shoe throughout the tread and side portions thereof circumferentially of the same, the links of each chain being disposed at the tread and for a distance at opposite sides thereof in overlapping close connected relation to each other, and the sizes of the links are greater at the center of the chain and gradually decrease toward the ends thereof so that the maximum strength of the chain is developed throughout the tread of the tire, thereby avoiding any possibility of blow-outs or other damage to the shoe when subjected to heavy loads or severe usage.

A still further object of the invention is the provision of a shoe of this character wherein the interlacing or connection of the links of the chain is of novel form so that said chains in their relative relation to each other form maximum reinforcements within the body of the shoe, yet the said body is capable of maximum resiliency and will resist punctures, blow-outs, stone or curb bruises or cuts which would render the shoe ineffective for use and protection to the inner tube of the tire.

A still further object of the invention is the provision of a shoe of this character wherein the chains constituting the reinforcement are embedded within the body thereof and are connected at their terminals to retaining cables which are also embedded within the body of the shoe at the points of the clencher flanges thereof so that the chains will be held against displacement or creeping action within the body when the shoe is subjected to heavy loads or constant use.

A still further object of the invention is the provision of a shoe of this character wherein the disposition of the reinforcement and its character renders the said shoe practically puncture proof, eliminating blow-outs and other damage thereto when in use with maximum strength and durability without materially increasing the weight of the shoe nor detracting from the required resiliency for absorbing shocks and jars incident to its use.

A still further object of the invention is the provision of a shoe of this character which is extremely simple in construction, thoroughly reliable and efficient in its purpose and inexpensive in manufacture.

Other objects will be in part obvious and in part hereinafter pointed out.

The invention accordingly consists in the features of construction, combination of elements and arrangement of parts which will be exemplified in the construction hereinafter described, and the scope of the application of which will be indicated in the appended claims.

In the accompanying drawings:

Figure 1 is a fragmentary plan view of a shoe constructed in accordance with the invention, with the tread portion thereof broken away;

Fig. 2 is an enlarged vertical transverse sectional view through the shoe;

Fig. 3 is a fragmentary side elevation, with the shoe partly broken away;

Fig. 4 is a plan view of one of the chain lengths removed from the shoe;

Fig. 5 is a vertical transverse sectional view through a modified form of the invention constructed as a reliner for a tire shoe; and Fig. 6 is a fragmentary side elevation showing the same partly broken away.

Similar reference characters indicate corresponding parts throughout the several views of the drawings.

Referring to the drawings in detail, A designates generally a portion of a shoe or casing of a tire which, as usual, is composed of fabric and rubber plies 5 and 6, respectively, the fabric plies being arranged relative to the rubber plies in the ordinary well known manner. The casing or shoe A is thickened at the edges thereof to form the clencher flanges 7, as usual, and embedded within these edges are retaining cables 8 which may be in the form of wires having the required strength and rigidity, although in substitute therefor any suitable annular retaining element can be placed in their stead. These cables 8, when embedded in the edges 7 of the casing or shoe A on opposite sides thereof, serve to hold the shoe in its completed form and avoid the stretching of the shoe, yet permit free flexibility in the walls and tread portion of the shoe when housing an inner tube.

Disposed transversely within the shoe or casing A, circumferentially thereof, is a series of reinforcing chains B which are embedded within the rubber 6 between plies of fabric 5 adjacent each other, with the terminals of said chains connected with the cables 8 on oppoosite sides of the shoe or casing A, the chains B being hereinafter fully described.

Each chain comprises a series or plurality of links 9 which are loosely connected with each other, the links being twisted so that the series or plurality will lie flat in their connected association with each other, such links centrally or intermediate the ends or length of the chain B being of increased size with respect to the remaining links, which latter gradually decrease in size in the direction of the terminals of the chain 10 so that said chains, when embedded within the casing or shoe A, will possess maximum strength at the point of the tread of the tire and for a distance on opposite sides thereof. The chains B, by reason of the sizes of the links 9, will permit the close association or assemblage of the same adjacent to each other circumferentially of the casing or shoe, whereby the links 9 of one chain length lying transversely of the casing or shoe A contact with the links 9 of the chain length adjacent thereto both throughout the tread area and the wall zones of the casing or shoe A, thereby avoiding any degree of separation between the chain lengths which would result in gaps in weakened portions in the casing or shoe.

Each link 9 of the chains 10 is devoid of any sharp corners or edges so that the possibility of any cutting action of the links upon the rubber 6 or fabric 5 is eliminated when the casing or shoe A is in constant use or subjected to heavy loads.

Of course it is to be understood that the chains B with respect to the conformation of the links 9 thereof and the assemblage in their group relationship or connection with each other can be varied as the occasion may require and also the sizes of the links can be altered or changed to best adapt the reinforcements within the casing or shoe A to the needs and usage thereof. However, the salient feature of the invention lies in the disposition of the chain lengths within the body of the casing or shoe in contradistinction to the application exteriorly thereof, as said chain lengths form a unitary permanent part of the casing or shoe to reinforce to the maximum degree the tread portion and the sides thereof so as to reduce to a minimum the possibility of a blow-out, stone or curb bruises or cuts and at the same time render the tire practically puncture proof.

In Figs. 5 and 6 there is shown a slight modification of the invention wherein the series of chains 10 which are constructed in the manner as hereinbefore set forth have their lengths disposed transversely and embedded within the body 11 of a reliner structure which is composed of the usual plies of rubber and fabric assembled in the ordinary manner to form the unitary body, the retaining cables 12 being also embedded within the edges of the body 11 of the reliner which is adaptable for insertion within a shoe or casing of the ordinary well known construction to lie between the latter and the inner tube so that in the use of the tire the reliner will serve as a protector to avoid blow-outs, punctures or other damage to the tire. The reliner is employed when the shoe or casing of the ordinary construction has become worn or weakened resultant from excessive wear so that further service thereof can be had and thus accordingly increase the life of the tire.

It is to be understood that the shoe or casing A and the reliner can be varied, altered or changed in their make-up as to the disposition of the fabric plies and rubber 6 without departing from the spirit of the invention or sacrificing any of its advantages. Also, changes, variations and modifications may be resorted to in the make-up of the chains B and the manufacture of the casing or shoe A and the reliner as come properly within the scope of the appended claims.

Having thus described my invention, I claim:

1. A tire including a flexible casing composed of rubber and fabric and terminating in beaded edges, annular retaining elements anchored in the beaded edges of the casing, and a chain protector consisting of a plurality of independent chain lengths embedded in the rubber directly transversely of the casing and having their respective ends anchored to the retaining elements, each chain length being composed of twisted links designed so as to prevent undue wear on the adjacent rubber when in use without affecting the flexibility of the casing, the chain lengths and the links of each chain length being arranged to reduce puncturing of the casing.

2. A tire including a casing composed of superposed layers of rubber and fabric and terminating in beaded edges, annular retaining elements anchored in the beaded edges of the casing, and a chain protector consisting of a plurality of independent chain lengths embedded between the rubber and directly transversely of the casing and having the respective ends anchored to the retaining elements, each chain length being composed of twisted links, the twists being at diametrically opposite points of said lengths so that the links of each chain length will lie in inset relation to each other and all links in concentric relation to the walls of the casing to prevent undue wear on the adjacent rubber when in use.

In testimony whereof I affix my signature.

CLAUDE W. STEWART.